United States Patent
Kweon et al.

(10) Patent No.: US 9,999,095 B2
(45) Date of Patent: Jun. 12, 2018

(54) METHOD AND APPARATUS FOR SETTING UP/RELEASING RADIO RESOURCE CONTROL CONNECTION BETWEEN EVOLVED NODE B AND USER EQUIPMENT IN COMMUNICATION SYSTEM

(71) Applicant: Samsung Electronics Co., Ltd., Gyeonggi-do (KR)

(72) Inventors: Ki-Suk Kweon, Gyeonggi-do (KR); Hyeon-Jin Kang, Seoul (KR); Kill-Yeon Kim, Gyeonggi-do (KR); Young-Ki Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 131 days.

(21) Appl. No.: 14/254,836

(22) Filed: Apr. 16, 2014

(65) Prior Publication Data

US 2014/0307659 A1    Oct. 16, 2014

(30) Foreign Application Priority Data

Apr. 16, 2013    (KR) .................... 10-2013-0041561

(51) Int. Cl.
*H04W 76/06*    (2009.01)
*H04W 52/02*    (2009.01)

(52) U.S. Cl.
CPC ....... *H04W 76/34* (2018.02); *H04W 52/0254* (2013.01); *H04W 76/28* (2018.02); *Y02D 70/00* (2018.01); *Y02D 70/1224* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/23* (2018.01)

(58) Field of Classification Search
CPC .................... H04W 76/064; H04W 52/0254
USPC ................................... 370/329-332
See application file for complete search history.

(56) References Cited

U.S. PATENT DOCUMENTS

| | | | |
|---|---|---|---|
| 2007/0259673 A1* | 11/2007 | Willars | H04W 52/0225 455/453 |
| 2012/0113904 A1* | 5/2012 | Anderson | H04W 72/042 370/329 |
| 2012/0122405 A1 | 5/2012 | Gerber et al. | |

(Continued)

FOREIGN PATENT DOCUMENTS

| | | |
|---|---|---|
| EP | 2028909 B1 | 7/2012 |
| WO | 2013024001 A1 | 2/2013 |

OTHER PUBLICATIONS

International Search Report dated Jul. 24, 2014 in connection with International Application No. PCT/KR2014/003298, 3 pages.

(Continued)

*Primary Examiner* — Jae Y Lee
*Assistant Examiner* — Jean F Voltaire

(57) ABSTRACT

A method for setting up/releasing by a user equipment (UE) a radio resource control (RRC) connection with an evolved node B (eNB) in a communication system is provided. The method includes detecting that traffic occurs. The method also includes that after detecting that the traffic occurs, determining a traffic type of the traffic The method further includes adaptively adjusting a timing point at which the UE releases a RRC connection between the eNB and the UE based on the traffic type.

12 Claims, 13 Drawing Sheets

(56) References Cited

U.S. PATENT DOCUMENTS

| | | | | |
|---|---|---|---|---|
| 2012/0129509 A1* | 5/2012 | Chan | ................. | H04W 52/0216 |
| | | | | 455/418 |
| 2012/0208570 A1* | 8/2012 | Park | ................... | H04W 76/068 |
| | | | | 455/466 |
| 2013/0039339 A1* | 2/2013 | Rayavarapu | ........ | H04W 76/028 |
| | | | | 370/331 |

OTHER PUBLICATIONS

Written Opinion of the International Searching Authority dated Jul. 24, 2014 in connection with International Application No. PCT/KR2014/003298, 6 pages.

Communication from a foreign patent office in a foreign counterpart application, Text of the First Office Action, Chinese Application No. 201480021471.9, dated Jan. 30, 2018, 23 pages.

* cited by examiner

METHOD AND APPARATUS FOR SETTING UP/RELEASING RADIO RESOURCE CONTROL CONNECTION BETWEEN EVOLVED NODE B AND USER EQUIPMENT IN COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Apr. 16, 2013 assigned Serial No. 10-2013-0041561, the entire disclosure of which is incorporated herein by reference.

TECHNICAL FIELD

The present disclosure relates to a method and apparatus for setting up and releasing a radio resource control (RRC) connection between an evolved node B (eNB) and a user equipment (UE).

BACKGROUND

Generally, for transmission/reception of data on network, a connection can be set up between a UE and an eNB. That is, the eNB can allocate a radio resource to the UE for communicating with the UE.

An eNB supporting a long term evolution (LTE) communication scheme which follows an LTE standard can use a RRC protocol in order to allocate a radio resource to a UE. That is, the eNB can allocate a radio resource to each of UEs which need a communication using the RRC protocol, and can release radio resources which are allocated to UEs which do not communicate among the UEs which are allocated the radio resources. The RRC protocol can be a protocol used for managing radio resources which will be allocated to UEs within a cell.

In the RRC protocol, a state of a UE can be classified into two states: a RRC_IDLE state and a RRC_CONNECTED state. Each of the RRC_IDLE state and the RRC_CONNECTED state will be descried below.

The RRC_IDLE state can be a state in which a UE is not allocated a radio resource from an eNB or a RRC connection between the UE and the eNB is released.

The RRC_CONNECTED state can be a state in which a UE can transmit/receive data to/from in a downlink (DL) or uplink (UL) after being allocated a radio resource form an eNB.

Recently, smart phones can be populated, so various applications such as a social network service (SNS), an instant messenger (IM) service, a voice over internet protocol (VoIP) service, a mail client, and the like are widely used. Most of these applications can run based on a push service or a polling service. For this, each of the applications periodically can transmit a keep alive message to an application server, or periodically receive a polling message from the application server in order to update data.

A size of the keep alive message or the polling message can be generally small (such as less than 1 KB), but the keep alive message or the polling message can be frequently transmitted. Messages used for transmitting/receiving non-user data which have relatively a small size and are frequently transmitted can be called "background control traffic", and can have the following characteristics.

Firstly, the background control traffic can be mostly transmitted by a UE. That is, applications which are installed in the UE can transmit/the background control traffic for operating the applications.

Secondly, the background control traffic can be transmitted regardless of user interaction. That is, the background control traffic can be transmitted without the user interaction such as a key input, a screen touch input, and a sound input from the user, or the like. Even though a screen of a smart phone is turned off, the background control traffic can be transmitted.

Thirdly, transmission of the background control traffic can be completed within a relative short time. That is, the background control traffic can consist of a few or dozens of packets, and the background control traffic can be relatively rapidly transmitted. Further, transmission of the background control traffic can be completed within few seconds, and there can be no traffic following the background control traffic.

Fourthly, the background control traffic can periodically occur. Each application can have a period for transmitting its background control traffic, and the period for transmitting the background control traffic can be variously set.

Lastly, the background control traffic can occur all day long. That is, each of the applications can continuously transmit its background control traffic to a related server in the middle of the night such as when a user sleeps. So, the background control traffic can occur with various periods all day long. This means that a UE can operate in the RRC_CONNECTED state during a relatively long time, and battery life time can severely decreases due to this. So, the decrease of the battery life time can result in a grave inconvenience to the user.

SUMMARY

To address the above-discussed deficiencies, it is a primary object to provide a method and apparatus for setting up/releasing a RRC connection between a UE and an eNB in a communication system.

Another aspect of the present disclosure is to provide a method and apparatus for setting up/releasing a RRC connection between a UE and an eNB based on a traffic type in a communication system.

Another aspect of the present disclosure is to provide a method and apparatus for setting up/releasing a RRC connection between a UE and an eNB in a communication system thereby decreasing battery consumption of the UE.

Another aspect of the present disclosure is to provide a method and apparatus for setting up/releasing a RRC connection between a UE and an eNB by adaptively operating an inactivity timer for transiting to an idle state based on a traffic type in a communication system.

Another aspect of the present disclosure is to provide a method and apparatus for setting up/releasing a RRC connection between a UE and an eNB by adaptively operating an inactivity timer for transiting to an idle state based on a traffic type in a communication system thereby increasing an efficiency of a radio resource.

In accordance with an aspect of the present disclosure, there is provided a method for setting up/releasing by a user equipment (UE) a radio resource control (RRC) connection with an evolved node B (eNB) in a communication system. The method includes detecting that traffic occurs. The method also includes determining a traffic type of the traffic after detecting that the traffic occurs The method further includes adaptively adjusting a timing point at which a UE releases a RRC connection between the eNB and the UE based on the traffic type.

In accordance with another aspect of the present disclosure, there is provided a method for setting up/releasing by a user equipment (UE) a radio resource control (RRC) connection with an evolved node B (eNB) in a communication system. The method includes detecting that traffic occurs. The method also includes determining a traffic type of the traffic after detecting that the traffic occurs The method further includes transmitting information related to the traffic type to the eNB thereby the eNB adaptively adjusts a timing point at which the eNB releases a RRC connection between the eNB and the UE.

In accordance with another aspect of the present disclosure, there is provided a method for setting up/releasing by an evolved node B (eNB) a radio resource control (RRC) connection with a user equipment (UE) in a communication system, the method comprising: receiving information related to a traffic type of traffic which occurs in a UE from the UE; and adaptively adjusting a timing point at which an eNB releases a RRC connection between the eNB and the UE based on the information related to the traffic type.

In accordance with another aspect of the present disclosure, there is provided a user equipment (UE) in a communication system. The UE includes a controller configured to detect that traffic occurs, determine a traffic type of the traffic after detecting that the traffic occurs, and adaptively adjust a timing point at which a UE releases a radio resource control (RRC) connection between an evolved node B (eNB) and the UE based on the traffic type.

In accordance with another aspect of the present disclosure, there is provided a user equipment (UE) in a communication system. The UE includes a controller configured to detect that traffic occurs, determine a traffic type of the traffic after detecting that the traffic occurs, and control a transmitter to transmit information related to the traffic type to an evolved node B (eNB) thereby the eNB adaptively adjusts a timing point at which the eNB releases a radio resource control (RRC) connection between the eNB and the UE.

In accordance with another aspect of the present disclosure, there is provided an evolved node B (eNB) in a communication system. The eNB includes a receiver configured to receive information related to a traffic type of traffic which occurs in a user equipment (UE) from the UE. The eNB also includes a controller configured to adaptively adjust a timing point at which an eNB releases a radio resource control (RRC) connection between the eNB and the UE based on the information related to the traffic type.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
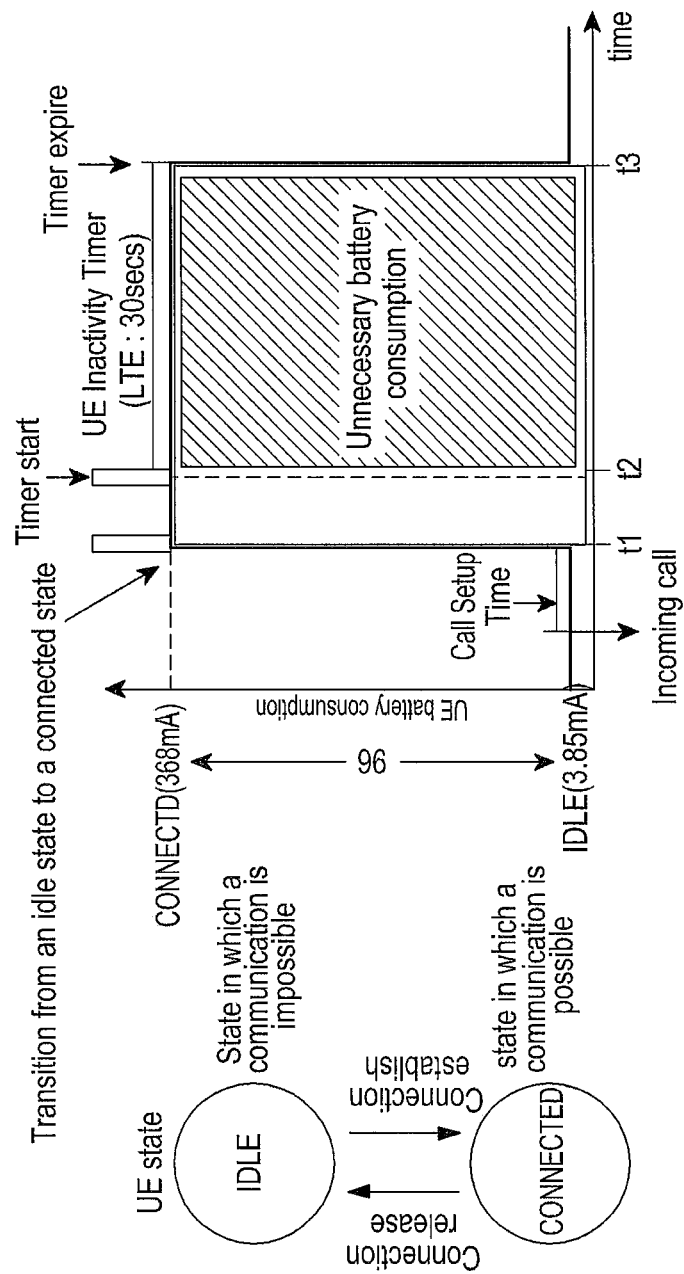
FIG. 1 is an example illustrating battery consumption according to a state transition of a UE in a communication system according to this disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system. The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Although ordinal numbers such as "first," "second," and so forth will be used to describe various components, those components are not limited herein. The terms are used only for distinguishing one component from another component. For example, a first component can be referred to as a second component and likewise, a second component can also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

An embodiment of the present disclosure proposes a method and apparatus for setting up/releasing a radio resource control (RRC) connection between a user equipment (UE) and an evolved node B (eNB) in a communication system.

An embodiment of the present disclosure proposes a method and apparatus for setting up/releasing a RRC connection between a UE and an eNB based on a traffic type in a communication system.

An embodiment of the present disclosure proposes a method and apparatus for setting up/releasing a RRC connection between a UE and an eNB in a communication system thereby decreasing battery consumption of the UE.

An embodiment of the present disclosure proposes a method and apparatus for setting up/releasing a RRC connection between a UE and an eNB by adaptively operating an inactivity timer for transiting to an idle state based on a traffic type in a communication system.

An embodiment of the present disclosure proposes a method and apparatus for setting up/releasing a RRC connection between a UE and an eNB by adaptively operating an inactivity timer for transiting to an idle state based on a traffic type in a communication system thereby increasing an efficiency of a radio resource.

A method and apparatus proposed in various embodiments of the present disclosure can be applied to various communication systems such as a Long Term Evolution (LTE) communication system, an LTE-Advanced (LTE-A) communication system, a High Speed Downlink Packet Access (HSDPA) mobile communication system, a High Speed Uplink Packet Access (HSUPA) mobile communication system, a High Rate Packet Data (HRPD) mobile communication system proposed in a 3rd Generation Project Partnership 2 (3GPP2), a Wideband Code Division Multiple Access (WCDMA) mobile communication system proposed in the 3GPP2, a Code Division Multiple Access (CDMA) mobile communication system proposed in the 3GPP2, an Institute of Electrical and Electronics Engineers (IEEE) mobile communication system, an Evolved Packet System (EPS), a Mobile Internet Protocol (Mobile IP) system, and/or the like.

An example of battery consumption according to a state transition of a UE in a communication system according to this disclosure will be described with reference to FIG. 1.

FIG. 1 is an example illustration of battery consumption according to a state transition of a UE in a communication system according to this disclosure.

Referring to FIG. 1, a UE can operate in a RRC_CONNECTED state or a RRC_IDLE state. Each of the RRC_CONNECTED state and the RRC_IDLE state will be described below.

The RRC_CONNECTED state can denote a state in which a communication is possible. The UE can perform a RRC connection setup procedure with an eNB in order to transit from the RRC_IDLE state to the RRC_CONNECTED state.

The RRC_IDLE state can denote a state in which the communication is impossible. The UE can perform a RRC connection release procedure with the eNB in order to transit from the RRC_CONNECTED state to the RRC_IDLE state.

Looking at a state change of the UE, the UE can transmit/receive messages according to a RRC connection setup procedure for transiting to a RRC RRC_CONNECTED state during call setup time upon detecting an incoming call. If the RRC connection setup procedure is completed, the UE can transit from the RRC_IDLE state to the RRC_CONNECTED state. A signalling occurred during the call setup time will be described with reference to FIG. 2.

If data communication is not performed during a preset time interval, the UE can transition from the RRC_CONNECTED state to the RRC_IDLE state. For this, if the UE lastly transmits a data packet, the eNB can trigger a UE inactivity timer for transitioning to the RRC_IDLE state. That is, if it is assumed that the UE starts a transmission of a data packet at a timing point t1 in FIG. 1, and transmits the last data packet at a timing point t2 in FIG. 1, the eNB can start operating the inactivity timer at the timing point t2. For example, an inactivity timer value of the inactivity timer can be 30 seconds in an LTE communication system. If an additional data packet is not received during a time interval from a timing point t3 as a timing point after 30 seconds from the timing point t2 to a timing point at which the inactivity timer expires, the eNB can transmit a RRC connection release message to the UE to release a communication link with the UE. Upon receiving the RRC connection release message, the UE can transition from the RRC_CONNECTED state to the RRC_IDLE state.

There can be a difference between battery consumption in a case that the UE operates in the RRC_IDLE state and battery consumption in a case that the UE operates in the RRC_CONNECTED state. For example, if the UE operates in the RRC_IDLE state, battery consumption of the UE can be 3.85 mA, and if the UE operates in the RRC_CONNECTED state, battery consumption of the UE can be 368 mA. The battery consumption in the case that the UE operates in the RRC_CONNECTED state can be 96 times that of the battery consumption in the case that the UE operates in the RRC_IDLE state.

In a case that the UE operates in the RRC_CONNECTED state, the UE can continuously occupy a radio resource even though the UE does not communicate with the eNB. So, if too many UE among UEs to which the eNB provides a service operate in the RRC_CONNECTED state, a problem such as a call drop or a call blocking can occur due to lack of resources.

In FIG. 1, upon receiving the incoming call request, the UE which operates in the RRC_IDLE state can transition to the RRC_CONNECTED state. However, the UE which operates in the RRC_IDLE state can transition to the RRC_CONNECTED state in a case that there is a need for data transmission/reception such as a case that the UE requests a web page according to a user interaction, and the like.

An example of battery consumption according to a state transition of a UE in a communication system according to this disclosure has been described with reference to FIG. 1, and a RRC connection setup procedure and a RRC connection release procedure according to a state transition of a UE in a communication system according to this disclosure will be described with reference to FIG. 2.

Figure 2:
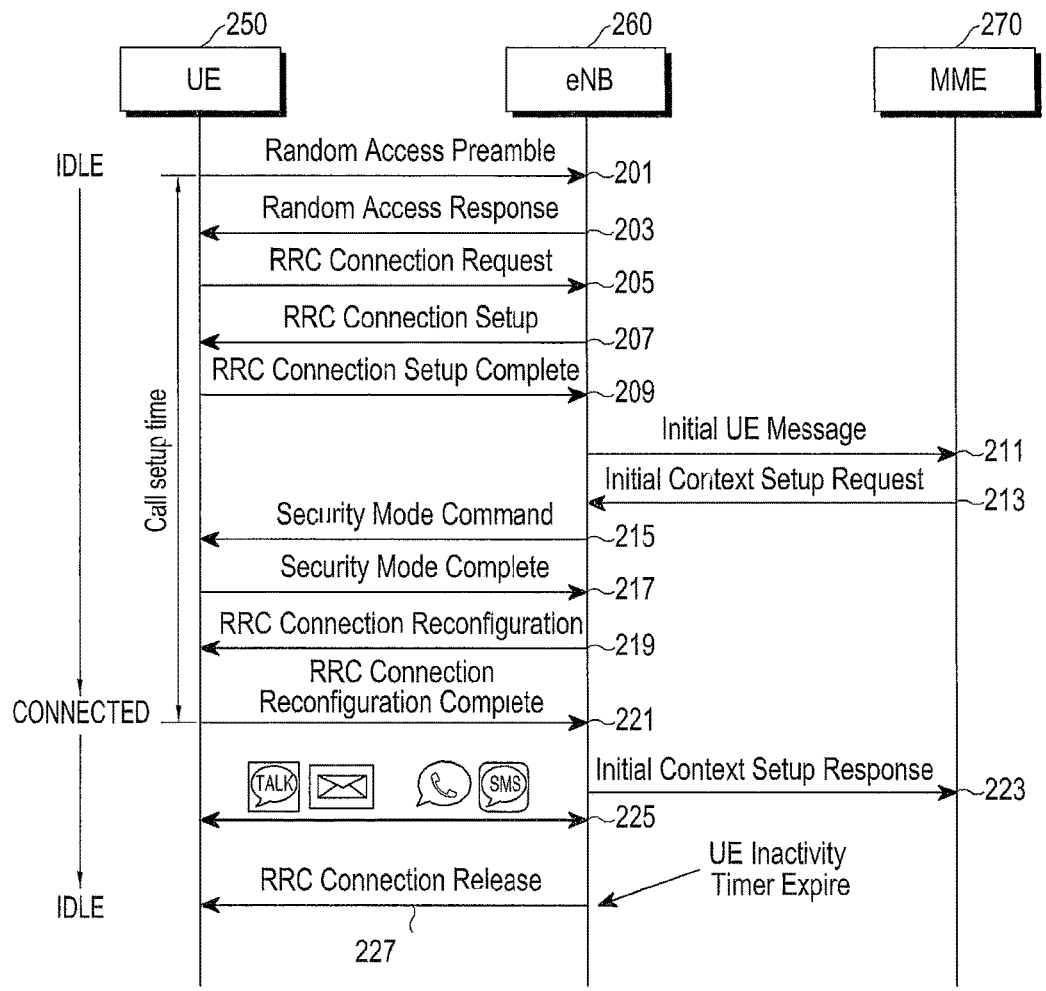
FIG. 2 is an example of an RRC connection setup procedure and a RRC connection release procedure according to a state transition of a UE in a communication system according to this disclosure.

FIG. 2 is an example illustrating an RRC connection setup procedure and a RRC connection release procedure according to a state transition of a UE in a communication system according to this disclosure.

Referring to FIG. 2, the communication system can include a UE 250, an eNB 260, and a mobile management entity (MME) 270.

The UE 250 transmits a random access preamble to the eNB 260 (operation 201), and receives a random access response message in response to the random access preamble from the eNB 260 (operation 203).

The UE 250 transmits a RRC connection request message to the eNB 260 (operation 205). The UE 250 receives a RRC connection setup message as a response message to the RRC connection request message from the eNB 260 (operation 207), and transmits a RRC connection setup complete message as a response message to the RRC connection setup message to the eNB 260 (operation 209).

The eNB 260 transmits an initial UE message to the MME 270 (operation 211), and receives an initial context setup request message from the MME 270 (operation 213).

The UE 250 receives a security mode command message from the eNB 260 (operation 215), and transmits a security mode complete message as a response message to the security mode command message to the eNB 260 (operation 217).

The UE 250 receives a RRC connection reconfiguration message from the eNB 260 (operation 219), and transmits a RRC connection reconfiguration complete message as a response message to the RRC connection reconfiguration message to the eNB 260 (operation 221).

As such, the UE 250 can set up the RRC connection with the eNB 260 through operations 201 to 221. Here, time during which operations 201 to 221 are performed can be called "call setup time". After setting up the RRC connection, the UE 250 can transition from the RRC_IDLE state to the RRC_CONNECTED state.

The eNB 260 transmits an initial context setup response message as a response message to the initial context setup request message to the MME 270 (operation 223), and performs a communication service providing operation with the UE 250 which transits to the RRC_CONNECTED state through the set up RRC connection (operation 225). For example, the communication service can include Kakaotalk©, a mail service, a voice service, a short message service (SMS), or the like.

Upon detecting that an additional communication message between the eNB 260 and the UE 250 does not occur until an inactivity timer included in the eNB 260 expires, the eNB 260 transmits a RRC connection release message which requests to release a RRC connection to the UE 250 (operation 227). After receiving the RRC connection release message, the UE 250 transitions from the RRC_CONNECTED state to the RRC_IDLE state.

As such, upon communicating with the eNB 260, the UE 250 can be configured to operate in the RRC_CONNECTED state. If an additional communication message does not occur during preset time, the UE 250 can be configured to transition to the RRC_IDLE state, and the aforementioned procedure should be performed for state transition of the UE 250. That is, the UE 250 can be configured to transmit/receive five uplink messages and four downlink messages to/from the eNB 260, and the eNB 260 can be configured to transmit/receive two uplink messages and one downlink messages to/from the MME 270.

As a result, the UE 250 can require thirteen messages for transitioning the RRC_IDLE state to the RRC_CONNECTED state. Thus, if a state transition of the UE 250 frequently occurs, this can result in excessive overhead for a system.

An example of an RRC connection setup procedure and a RRC connection release procedure according to a state transition of a UE in a communication system according to this disclosure is described with reference to FIG. 2, and an example of an expected busy hour call attempts (BHCA) and the number of UEs which operate in an active state according to an inactivity timer value according to this disclosure will be described with reference to FIG. 3.

Figure 3:
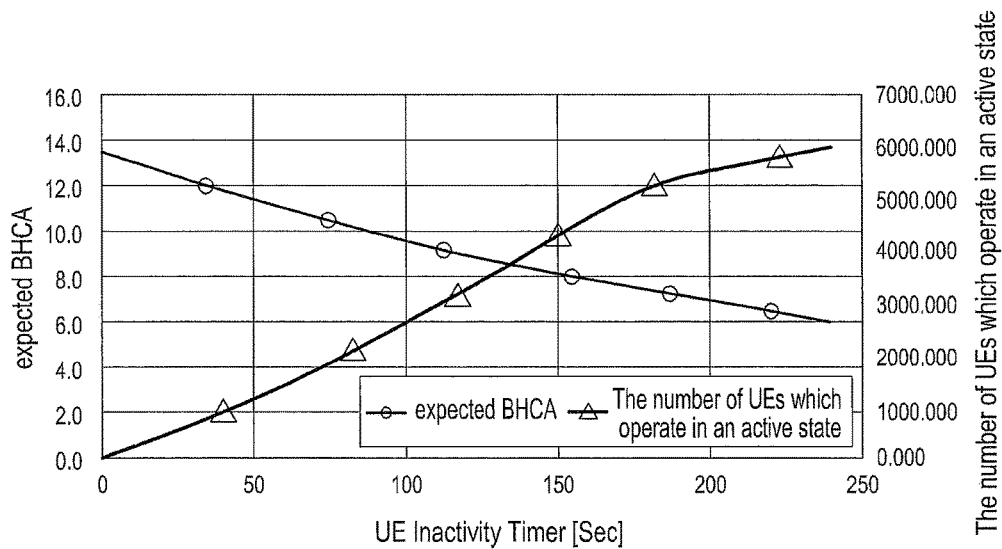
FIG. 3 is an example illustrating an expected BHCA and the number of UEs which operate in an active state according to an inactivity timer value according to this disclosure.

FIG. 3 is an example illustrating an expected BHCA and the number of UEs which operate in an active state according to an inactivity timer value according to this disclosure.

Referring to FIG. 3, a graph can indicate a result of a simulation in which the number of subscribers per cell is 6000 by a smart phone subscriber call model on December, 2011. Here, BHCA in FIG. 3 can indicate BHCA which switching center can process during one hour in a time zone that there are the most telephone calls, and generally means a unit of measuring a call processing capability of the switching center or related devices. The number of UEs which operate in an active state means the number of UEs which can operate in a RRC_CONNECTED state and set up a communication link with an eNB.

As illustrated in FIG. 3, the greater an inactivity time value becomes, the longer a UE can operate in the RRC_CONNECTED state. And, the greater the inactivity time value becomes, the more increased battery consumption of the UE can become. Further, the greater the inactivity time value becomes, the more increased holding time per UE can become, so available resources of the communication system can decrease.

On the other hand, the less the inactivity time value becomes, the more frequent a request of state transition of the UE can occur, so BHCA can increase. If the UE frequently requests a state transition due to an increase of the BHCA, call setup time which the eNB should process can increase. Thus, data delay time can increase due to increase of the call set up time.

An example of an expected BHCA and the number of UEs which operate in an active state according to an inactivity timer value according to this disclosure have been described with reference to FIG. 3, and a period by which background control traffic can occur during a preset time in a communication system according to this disclosure will be described with reference to FIG. 4.

Figure 4:
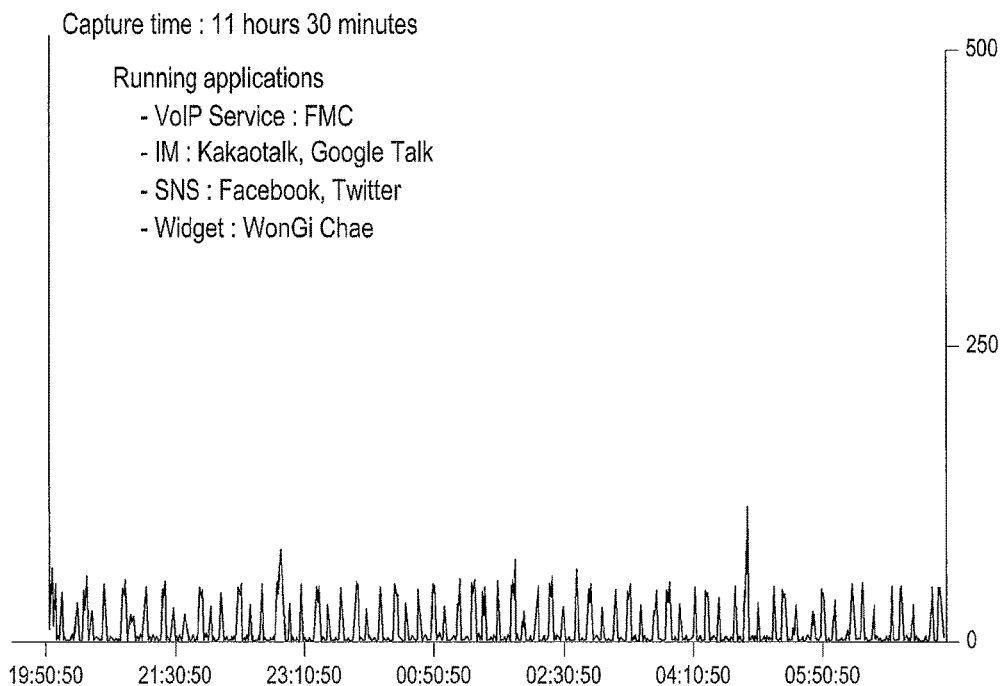
FIG. 4 is an example of a period by which background control traffic occurs during preset time in a communication system according to this disclosure.

FIG. 4 is an example illustration of a period by which background control traffic occurs during preset time in a communication system according to this disclosure.

Referring to FIG. 4, a graph can indicate a period of background control traffic which occurs in a UE during preset time, such as 11 hours 30 minutes. The graph can indicate the period of the background control traffic which occurs in the UE during the preset time if an application which runs on the UE uses a fixed mobile convergence (FMC) service as a VoIP service, Kakaotalk© and Google© as an IM service, Facebook© and Twitter© as an SNS, and WonGi Chae© as a widget service.

A period (such as a minute), the number of messages, and the number of occurrences (such as the number of occurrences in a day) for background control traffic per application which runs on the UE can be expressed in Table 1.

TABLE 1

| application | period (minute) | the number of messages | the number of occurrences (day) |
|---|---|---|---|
| Voip(FMC) | 25 | 45 | 58 |
| | 2 | 4 | 720 |
| | 35 | 35 | 41 |
| Facebook © | 15 | 10 | 96 |
| Google © | 15 | 40 | 96 |
| Twitter © | 30 | 40 | 48 |
| Kakaotalk © | 30 | 40 | 144 |
| WonGi Chae © | 30 | 40 | 48 |

As described in Table 1, the number of occurrences for background control traffic of the applications which can run on the UE is 1251, and this means that background control traffic can occur 50 times within two seconds.

Based on the simulation result, it will be understood that the UE can generate background control traffic regardless of a user input. That is, it will be understood that the UE can generate the background control traffic regardless of a user interaction. That is, even though a screen is turned off, or there is no user input, such as a sound input, a screen touch, and a key input, the background control traffic can occur. Transmission/reception of the background control traffic can be completed within a relative short time (such as 2 seconds), and background control traffic per application can periodically occur.

The background control traffic, such as non-user traffic can be traffic which periodically occurs. If the occurred traffic is traffic which periodically occurs, the occurred traffic can be non-user traffic. If the occurred traffic is not the traffic which periodically occurs, the occurred traffic can be user traffic.

An example of a period by which background control traffic occurs during preset time in a communication system according to this disclosure has been described with reference to FIG. 4, and an example of UE usage patterns of users in a communication system according to this disclosure will be described with reference to FIG. 5.

Figure 5:
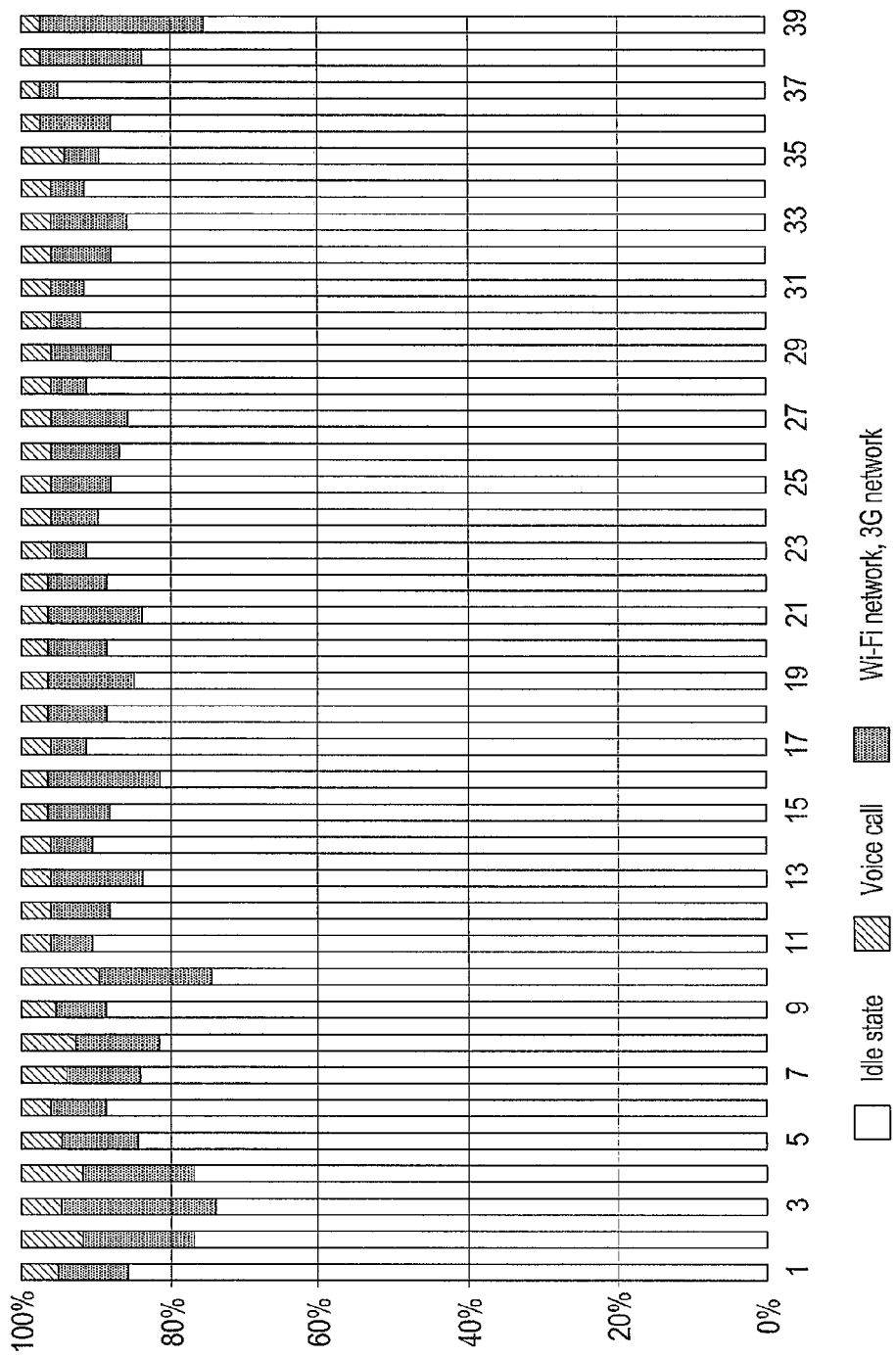
FIG. 5 is an example experimental value for UE usage patterns of users in a communication system according to this disclosure.

FIG. 5 is an example illustration of an experimental value for UE usage patterns of users in a communication system according to this disclosure.

Prior to a description of FIG. 5, an experimental value for UE usage patterns of users is an excerpt from "collection and analysis of smart phone usage pattern for managing mobile communication network", KNOM Conference 2011 (Postech) which is hereby incorporated by references as if fully set forth herein.

In FIG. 5, usage patterns per day for 39 users which are randomly selected is illustrated, and a related pattern which reflects an idle state, a voice call, a WiFi network communication/3G network communication, and the like during 24 hours is illustrated by percentage. As illustrated in FIG. 5, an idle state of the usage patterns for the 39 users can occupy 85% per day on average, so a UE can operate in an idle state in which there is no user input during 20.4 hours among 24 hours, so only background control traffic not user traffic occurs on the 20.4 hours.

That is, user traffic for a WiFi network communication/3G network communication, a voice call, and the like can occur during remaining 3.6 hours.

Like this, a UE can operate in an idle state during 20.4 hours per day on average. However, an inactivity timer used for the UE to transit to a RRC_IDLE state can always be operated according to a fixed inactivity timer value regardless of a traffic type. Due to this, time during which the UE can operate in a RRC-CONNECTED state unnecessarily increases even though user traffic does not occur in an idle state, so battery consumption of the UE can increase.

Accordingly, in an embodiment a scheme of adaptively setting an inactivity timer value based on a traffic type of traffic which occurs in a UE, such as based on whether the traffic is user traffic or background control traffic is disclosed herein.

In an embodiment a method of operating an inactivity timer in an LTE communication system or a 3G communication system is also disclosed herein. However, it will be understood by those of ordinary skill in the art that the method of operating the inactivity timer can be applied to other communication systems.

An example of a procedure of setting up a RRC connection between a UE and an eNB in a communication system according to this disclosure will be described with reference to FIG. 6.

Figure 6:
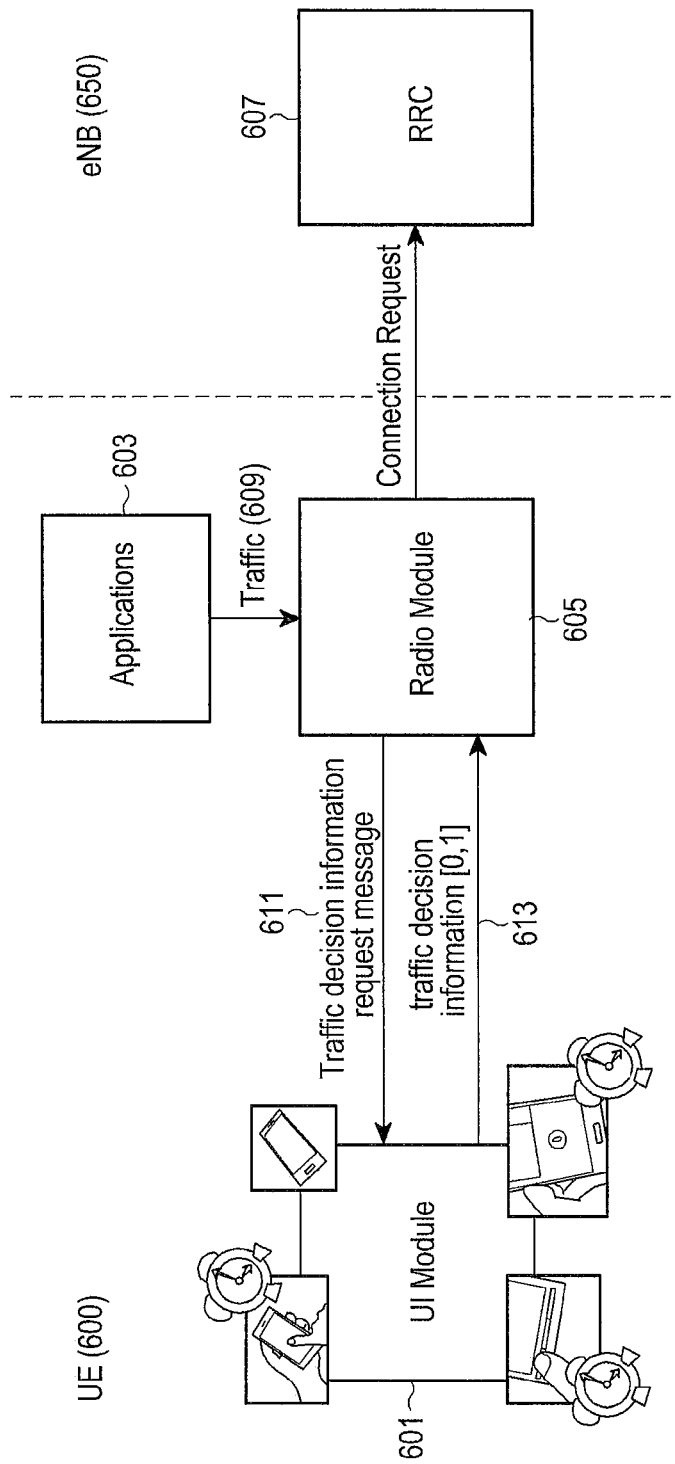
FIG. 6 is an example of a procedure of setting up a RRC connection between a UE and an eNB in a communication system according to this disclosure.

FIG. 6 is an example illustration of a procedure of setting up a RRC connection between a UE and an eNB in a communication system according to this disclosure.

Referring to FIG. 6, the communication system can include a UE 600 and an eNB 650. The UE 600 can include a user interface (UI) module 601 and a radio module 605, and the eNB 650 can include a RRC module 607.

The UI module 601 can be configured to monitor a user interaction, and determine whether the user interaction currently occurs in the UE 600. The UI module 601 can be configured to manage one or more timers, and start operating a related timer if the user interaction is detected. That is, if the UI module 601 detects the user interaction, the UI module 601 can be configured to start operating the related timer, and determine that the user interaction occurs in the UE 600 if each timer does not expire.

For example, when the UE 600 includes one timer, the timer can be configured to start operating if a user pushes a button, and the timer can be initialized to a reset state if a user input re-occurs before the timer expires. As another example, when the UE 600 includes a plurality of timers, one timer can be configured to start operating if user traffic according to a user input is detected. If a user runs one or more other applications, or a user interaction occurs in the UE 600, other timer can begin operation. If the user interaction does not occur before the timer which firstly starts being operated expires, the timer which firstly starts being operated expires, and the UI module 601 can be configured to determine that the user interaction does not occur in the UE 600. The UI module 601 can be configured to determine whether the user interaction occurs based on a screen state of the UE 600. Even though all timers expire, the UI module 601 can be configured to determine that a user currently uses the UE 600 if a screen of the UE 600 is turned on. For example, the application 603 can use an FMC service as a VoIP service, Kakaotalk© and Google© as an IM service, Facebook© and Twitter© as an SNS, and WonGi Chae© as a widget service. The application 603 can generate user traffic which occurs according to a user interaction and background control traffic which can occur regardless of the user interaction.

The radio module 605 can be configured to perform a transmitting/receiving procedure used for a communication with the eNB 650, request traffic decision information for determining whether traffic which occurs in the application 603 is user traffic or background control traffic to the UI module 601, and receive the traffic decision information from the UI module 601.

Here, the user traffic can denote traffic which occurs according to a user interaction in a case that various applications such as a call, an SMS, a game, a messenger, and the like run. For example, the user interaction can include a button touch, a screen touch, a sound input, and the like. Further, the user interaction can include whether a screen is turned on or off.

The background control traffic can denote traffic which occurs regardless of the user interaction, and a communication for the background control traffic can be completed within relatively short time (such as 2 seconds). The background control traffic can periodically occur per application.

In an operation of setting up a RRC connection between the UE 600 and the eNB 650, traffic which is generated in the application 603 can be transferred to the radio module 605 (operation 609). The radio module 605 can request traffic decision information to the UI module 610 by transmitting a traffic decision request message in order to determine whether the transferred traffic is user traffic or background control traffic (operation 611). The radio module 605 can receive traffic decision information [0,1] in response to the traffic decision request message from the UI module 601 (operation 613). For example, the traffic decision information can be implemented with a flag. If an inactivity flag value, such as a UE inactivity flag value is set to a preset inactivity flag value, such as "1", it can mean that the occurred traffic is the user traffic, and if the UE inactivity flag value is set to a preset inactivity flag value, such as "0", it can mean that the occurred traffic is the background control traffic. Further, the inactivity flag value can be set to "1" if the UI module 601 detects a user interaction, and can be set to "0" if the UI module 601 does not detect the user interaction.

Receiving the traffic decision information [0,1], the radio module 605 can be configured to determine whether the traffic received from the application 603 is the user traffic or the background control traffic according to the traffic decision information. If the traffic decision information, such as the inactivity flag value is "0", the radio module 605 can be configured to determine that the traffic received from the application 603 is the background control traffic. The radio module 605 can be configured to transmit a RRC connection request message which requests to set up a RRC connection to the eNB 650. Here, the UE 600 can include an inactivity flag into the RRC connection request message to transmit the RRC connection request message according to whether a network which the UE 600 accesses is an LTE communication network or a 3G communication network. If the network which the UE 600 accesses is the LTE communication network, the UE 600 can include the inactivity flag into the RRC connection request message to transmit the RRC connection request message.

While the UI module 601 and the radio module 605 are shown in FIG. 6 as separate units, it is to be understood that this is merely for convenience of description. In other words, the UI module 601 and the radio module 605 can be incorporated into a single unit.

A procedure of setting up a RRC connection between a UE and an eNB in a communication system according to an embodiment of the present disclosure has been described with reference to FIG. 6, and a process of transmitting/receiving a signal according to a procedure of setting up a RRC connection between a UE and an eNB in a communication system according to an embodiment of the present disclosure will be described with reference to FIG. 7.

Figure 7:
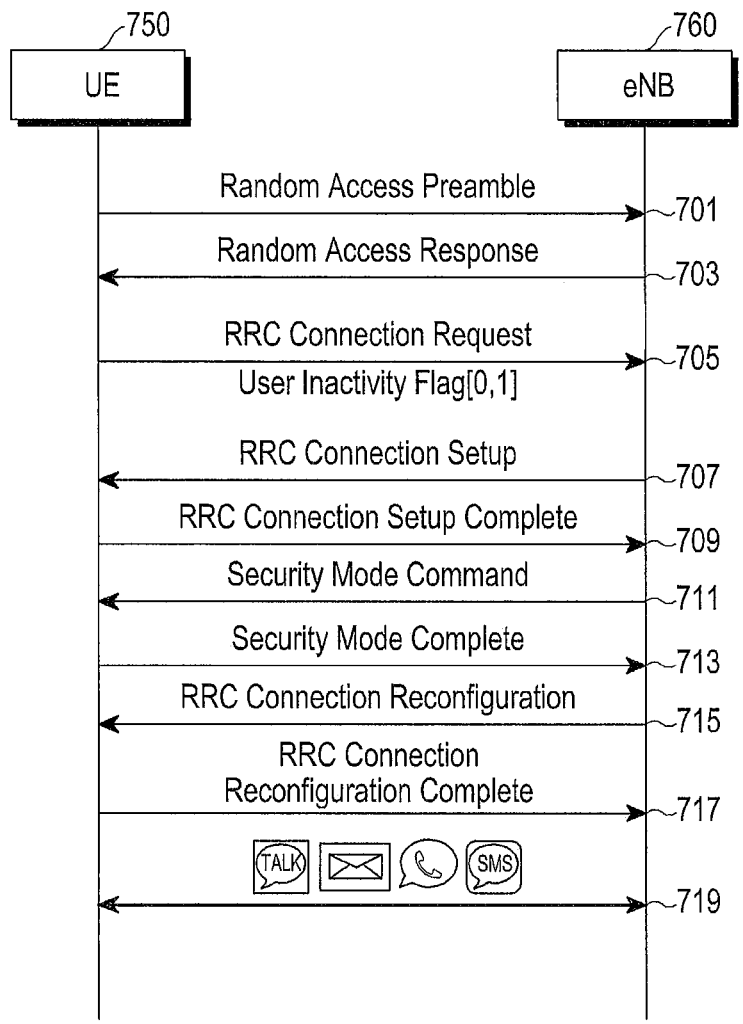
FIG. 7 is an example of a process of transmitting/receiving a signal according to a procedure of setting up a RRC connection between a UE and an eNB in a communication system according to this disclosure.

FIG. 7 is an example illustration of a process of transmitting/receiving a signal according to a procedure of setting up a RRC connection between a UE and an eNB in a communication system according to this disclosure.

Referring to FIG. 7, the communication system can include a UE 750 and an eNB 760. It will be noted that a process of transmitting/receiving a signal according to a procedure of setting up a RRC connection between the UE 750 and the eNB 760 in FIG. 7 can be a process of transmitting/receiving a signal according to a procedure of setting up a RRC connection between a UE and an eNB in an LTE communication system.

The UE 750 can transmit a random access preamble to the eNB 760 (operation 701), and receive a random access response message in response to the random access preamble from the eNB 760 (operation 703).

The UE 750 can transmit a RRC connection request message with an inactivity flag [1 or 0] which indicates that traffic occurs in the UE 750 is user traffic or background control traffic to the eNB 760 (operation 705). Here, an inactivity flag value of the inactivity flag can be set to '1' or '0'. If the inactivity flag value is set to 1', it can mean that the occurred traffic is the user traffic. If the inactivity flag value is set to '0', it can mean that the occurred traffic is the background control traffic.

The UE 750 can receive a RRC connection setup message from the eNB 760 (operation 707), and transmit a RRC connection setup complete message as a response message to the RRC connection setup message to the eNB 760 (operation 709).

The UE 750 can receive a security mode command message from the eNB 760 (operation 711), and transmit a security mode complete message as a response message to the security mode command message to the eNB 760 (operation 713).

The UE 750 can receive a RRC connection reconfiguration message from the eNB 760 (operation 715), and transmit a RRC connection reconfiguration complete message as a response message to the RRC connection reconfiguration message to the eNB 760 (operation 717).

The UE 750 can set up the RRC connection with the eNB 760 through operations 701 to 717, and performs a communication with the eNB 760 (operation 719).

Although FIG. 7 is an example illustration of a process of transmitting/receiving a signal according to a procedure of setting up a RRC connection between a UE and an eNB in a communication system, various changes could be made to FIG. 7 without departing from the spirit of this disclosure. For example, while shown as a series of operations, various operations in FIG. 7 can overlap, occur in parallel, occur in a different order, or occur multiple times.

An example of a process of transmitting/receiving a signal according to a procedure of setting up a RRC connection between a UE and an eNB in a communication system according to this disclosure has been described with reference to FIG. 7, and an example of a process of releasing a RRC connection between a UE and an eNB in a communication system according to this disclosure will be described with reference to FIG. 8.

Figure 8:
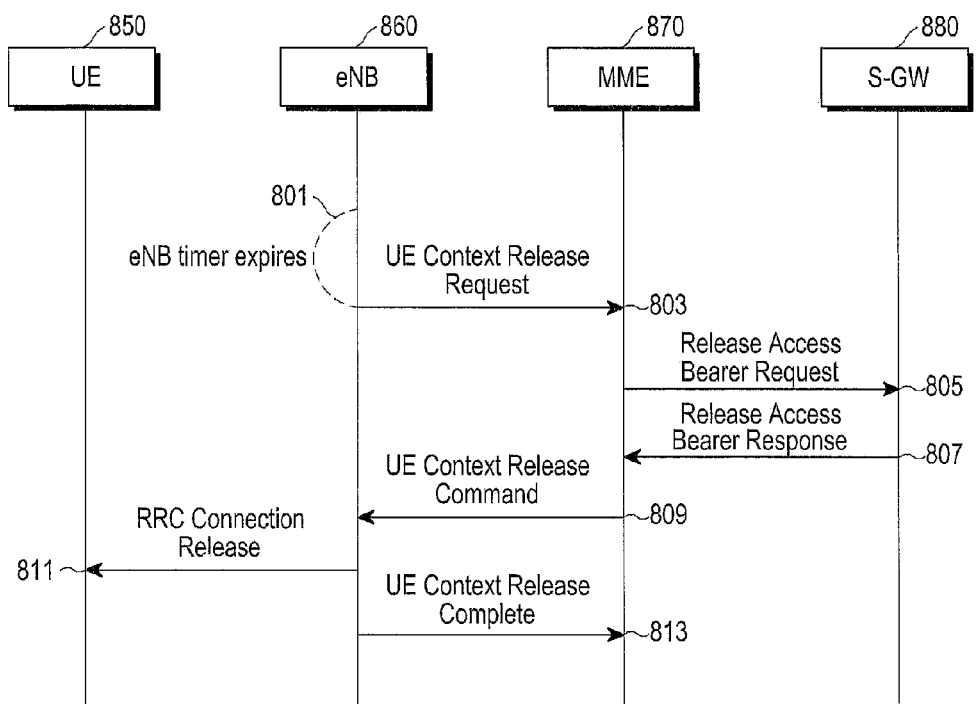
FIG. 8 is an example of a process of releasing a RRC connection between a UE and an eNB in a communication system according to this disclosure.

FIG. 8 is an example illustration of a process of releasing a RRC connection between a UE and an eNB in a communication system according to this disclosure.

Referring to FIG. 8, the communication system can include a UE 850, an eNB 860, an MME 870, and a serving gateway (S-GW) 880.

For example, it will be noted that a process of releasing a RRC connection between the UE 850 and the eNB 860 can be a process of releasing a RRC connection between a UE and an eNB in an LTE communication system. Since the eNB 860 can be configured to manage an inactivity timer, the UE 850 can include an inactivity flag indicating that traffic which occurs in the UE 850 is user traffic or background control traffic into a RRC connection request message to transmit the RRC connection request message to the eNB 860. The eNB 860 can be configured to set an inactivity timer value of the inactivity timer based on an inactivity flag value of the inactivity flag.

The eNB 860 can be configured to inspect the inactivity flag value of the inactivity flag received from the UE 850 and set an appropriate inactivity timer value. If the inactivity flag value is '0', the eNB 860 can be configured to determine that the occurred traffic is the background control traffic, set the inactivity timer value to an inactivity timer value less than a preset inactivity timer value, and start operating the inactivity timer based on the set inactivity timer value.

If the inactivity flag value is "1", the eNB can determine that the occurred traffic is the user traffic, set the inactivity flag value to the preset inactivity flag value, and start operating the inactivity timer based on the set inactivity flag value. If the inactivity timer expires (operation 801), the eNB 860 can detect that no traffic occurs during a time interval, such as a time during which the inactivity timer is operated, and transmit a UE context release request message which requests to release a RRC connection with the UE 850 to the MME 870 (operation 803).

Upon receiving the UE context release request message, the MME 870 can transmit a release access bearer request message to the S-GW 880 (operation 805), and receive a release access bearer response message as a response message to the release access bearer request message from the S-GW 880 (operation 807).

Upon receiving the release access bearer response message, the MME 870 can transmit a UE context release command message to the eNB 860 (operation 809).

Upon receiving the UE context release command message, the eNB 860 can transmit a RRC connection release message to the UE 850 (operation 811). The UE 850 can transition from a RRC_CONNECTED state to a RRC_IDLE state through operation 811.

The eNB 860 can transmit a UE context release complete message to the MME 870 (operation 813).

Although FIG. 8 illustrates an example of a process of releasing a RRC connection between a UE and an eNB in a communication system, various changes could be made to FIG. 8. For example, while shown as a series of operations, various operations in FIG. 8 can overlap, occur in parallel, occur in a different order, or occur multiple times.

An example of a process of releasing a RRC connection between a UE and an eNB in a communication system according to this disclosure has been described with reference to FIG. 8, and another example of a process of releasing a RRC connection between a UE and an eNB in a communication system according to this disclosure will be described with reference to FIG. 9.

Figure 9:
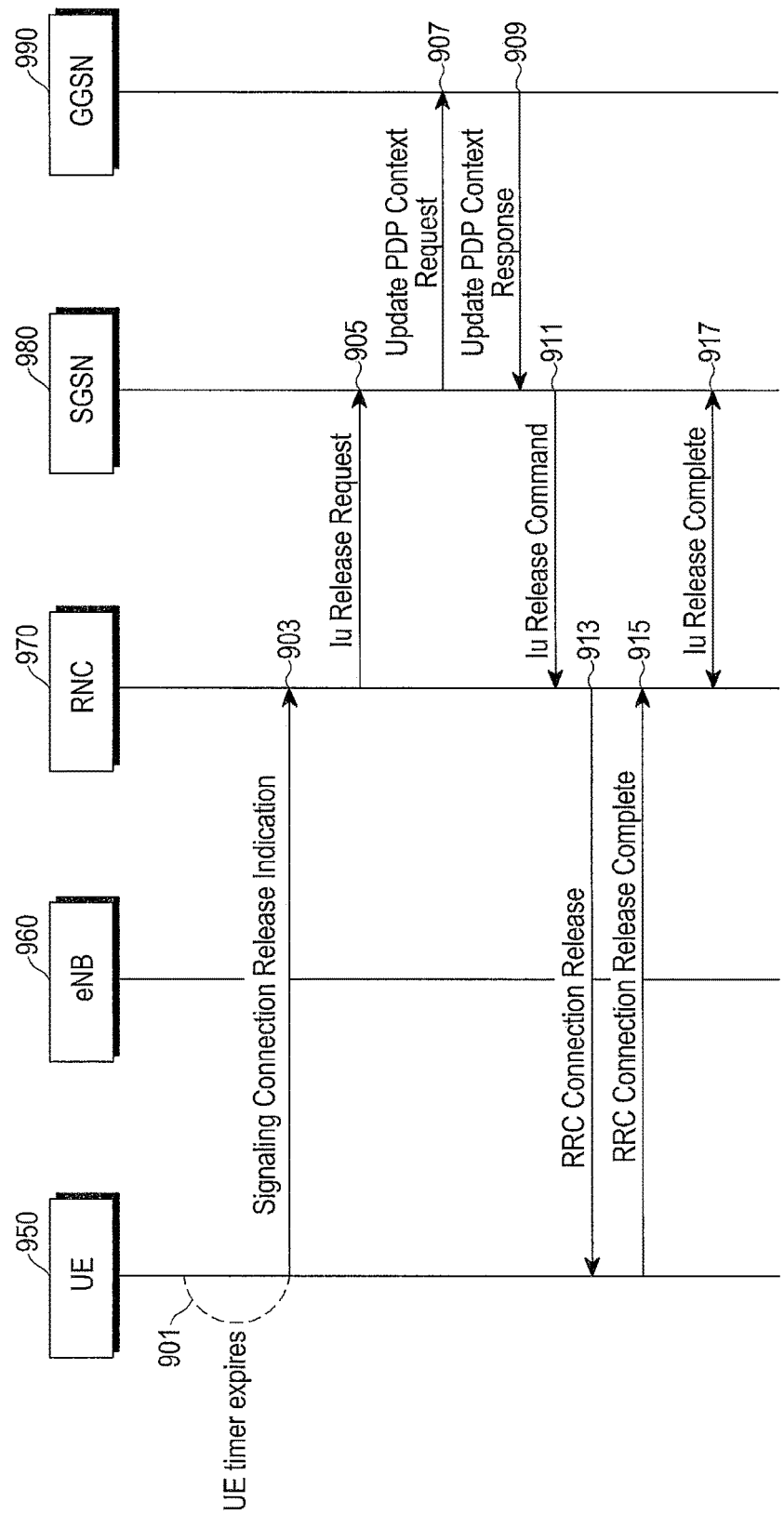
FIG. 9 is an example of a process of releasing a RRC connection between a UE and an eNB in a communication system according to this disclosure.

FIG. 9 is an example of a process of releasing a RRC connection between a UE and an eNB in a communication system according to this disclosure.

Referring to FIG. 9, the communication system can include a UE 950, an eNB 960, a radio network controller (RNC) 970, a serving general packet radio service (GPRS) support node (SGSN) 980, and a gateway GPRS support node (GGSN) 990.

It will be noted that a process of releasing a RRC connection between a UE and an eNB in FIG. 9 can be a process of releasing a RRC connection between a UE and an eNB in a 3G communication system. In the 3G communication system, the UE 950 can be configured to manage an inactivity timer, so the UE 950 can detect an inactivity flag value which has been set, and set an inactivity timer value based on the detected inactivity flag value.

If the inactivity flag value is 0, the UE 950 can be configured to determine that the occurred traffic is background control traffic, set the inactivity timer value to an inactivity timer value less than a default inactivity timer value, and start operating the inactivity timer.

If the inactivity flag value is 1, the UE 950 can be configured to determine that the occurred traffic is user traffic, set the inactivity timer value to the default inactivity timer value, and start operating the inactivity timer. If the inactivity timer expires (operation 901), the UE 950 can transmit a signaling connection release indication message to the RNC 970 in order to request to release a RRC connection which is set up between the UE 950 and the eNB 960 since traffic does not occur during a time interval on which the inactivity timer is operated (operation 903).

Upon receiving the signaling connection release indication message from the UE 950, the RNC 970 can transmit an Iu release request message to the SGSN 980 (operation 905). Upon receiving the Iu release request message from the RNC 970, the SGSN 980 can transition to a preservation state.

The SGSN 980 can transmit a update packet data protocol (PDP) context request message to the GGSN 990 (operation 907). After receiving the update PDP context request message from the SGSN 980, the GGSN 990 can transmit a update PDP context response message as a response message to the update PDP context request message to the SGSN 980, so the SGSN 980 can receive the update PDP context response message (operation 909).

Upon receiving the update PDP context response message from the GGSN 990, the SGSN 980 can transmit an Iu release command message to the RNC 970 (operation 911). Upon receiving the Iu release command message, the RNC 970 can transmit a RRC connection release message to the UE 950 (operation 913).

After receiving the RRC connection release message from the RNC 970, the UE 950 can transmit a RRC connection release complete message as a response message to the RRC connection release message to the RNC 970 (operation 915). The RRC connection which is set up between the UE 950 and the eNB 960 can be released through operations 913 and 915.

The RNC 970 can perform an Iu release complete procedure with the SGSN 980 (operation 917).

In the 3G system, the UE 950 can include the inactivity timer. So, if the inactivity timer expires, the UE 950 can release the RRC connection between the UE 950 and the eNB 960 by transmitting the signaling connection release indication message to the eNB 960.

Although FIG. 9 is an example of a process of releasing a RRC connection between a UE and an eNB in a communication system, various changes could be made to FIG. 9. For example, while shown as a series of operations, various operations in FIG. 9 can overlap, occur in parallel, occur in a different order, or occur multiple times.

Another example of a process of releasing a RRC connection between a UE and an eNB in a communication system according to this disclosure has been described with reference to FIG. 9, and an example of a process of setting up a RRC connection in a UE in a communication system according to this disclosure will be described with reference to FIG. 10.

Figure 10:
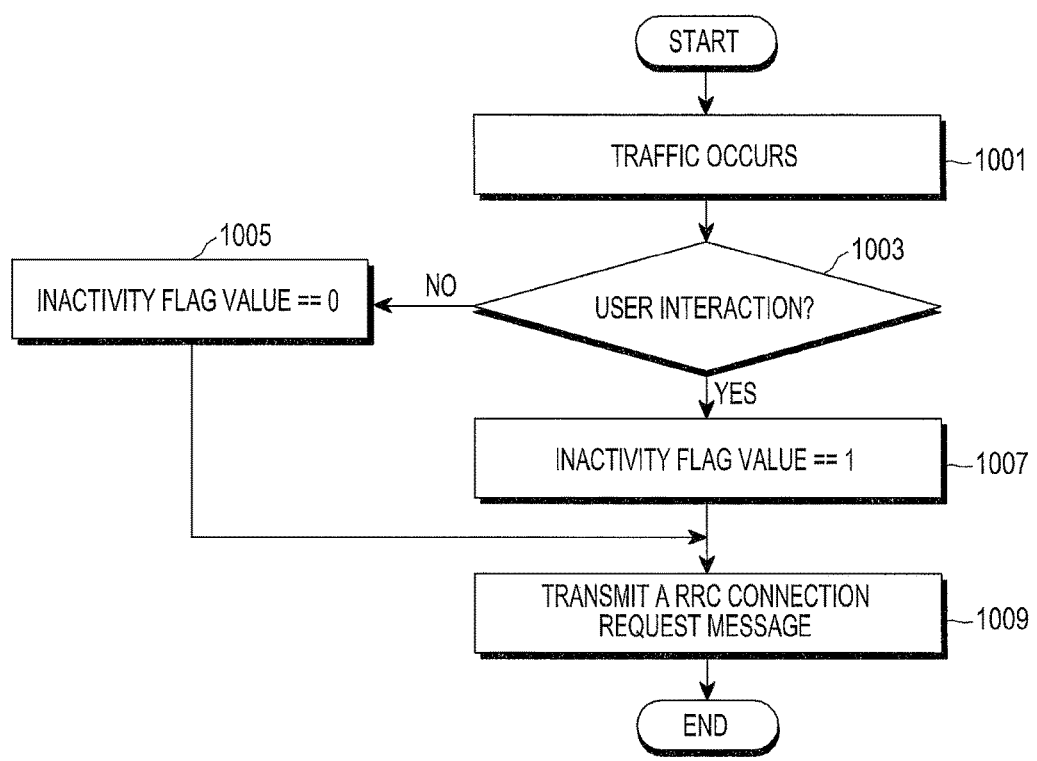
FIG. 10 is an example of a process of setting up a RRC connection in a UE in a communication system according to this disclosure.

FIG. 10 is an example of a process of setting up a RRC connection in a UE in a communication system according to this disclosure.

It will be noted that a process of setting up a RRC connection in a UE can be a process of setting up a RRC connection in a UE in an LTE communication system.

Referring to FIG. 10, a UE can detect that traffic occurs (operation 1001), and determine whether a user interaction occurs (operation 1003). That is, the UE can determine whether the user interaction is detected. If the user interaction occurs, that is, if the user interaction is detected, the UE can set an inactivity flag value to '1' (operation 1007). If the inactivity flag value is set to '1', it can mean that the occurred traffic is user traffic.

If the user interaction does not occur, that is, if the user interaction is not detected, the UE can set the inactivity flag value to '0' (operation 1005). If the inactivity flag value is set to '0', it can mean that the occurred traffic is background control traffic.

The UE can include the inactivity flag of which the inactivity flag value is set at operation 1005 or operation 1007 into a RRC connection request message to transmit the RRC connection request message to an eNB (operation 1009).

The inactivity flag can be a field which is newly defined and can be implemented with 1 bit.

In FIG. 10, if the inactivity flag value is 0, it can mean that the user interaction is detected, and if the inactivity flag value is 1, it can mean that the user interaction is not detected.

However, it will be understood by those of ordinary skill in the art that if the inactivity flag value is 1, it can mean that the user interaction is detected, and if the inactivity flag value is 0, it can mean that the user interaction is not detected.

In FIG. 10, a UE can set up a RRC connection with an eNB in an LTE communication system, however, it will be understood by those of ordinary skill in the art that the process of setting up the RRC connection can be applied to a 3G communication system. That is, operations 1001 to 1007 can be performed in the same manner in the 3G communication system. However, in the 3G communication system, the UE can operate an inactivity timer for transiting to an idle state, so the UE does not transmit an inactivity flag value to the eNB unlike the LTE communication system.

Although FIG. 10 illustrates an example of a process of setting up a RRC connection in a UE in a communication system, various changes could be made to FIG. 10. For example, while shown as a series of operations, various operations in FIG. 10 can overlap, occur in parallel, occur in a different order, or occur multiple times.

An example of a process of setting up a RRC connection in a UE in a communication system according to this disclosure has been described with reference to FIG. 10, and an example of a process of releasing a RRC connection in an eNB in a communication system according to this disclosure will be described with reference to FIG. 11.

Figure 11:
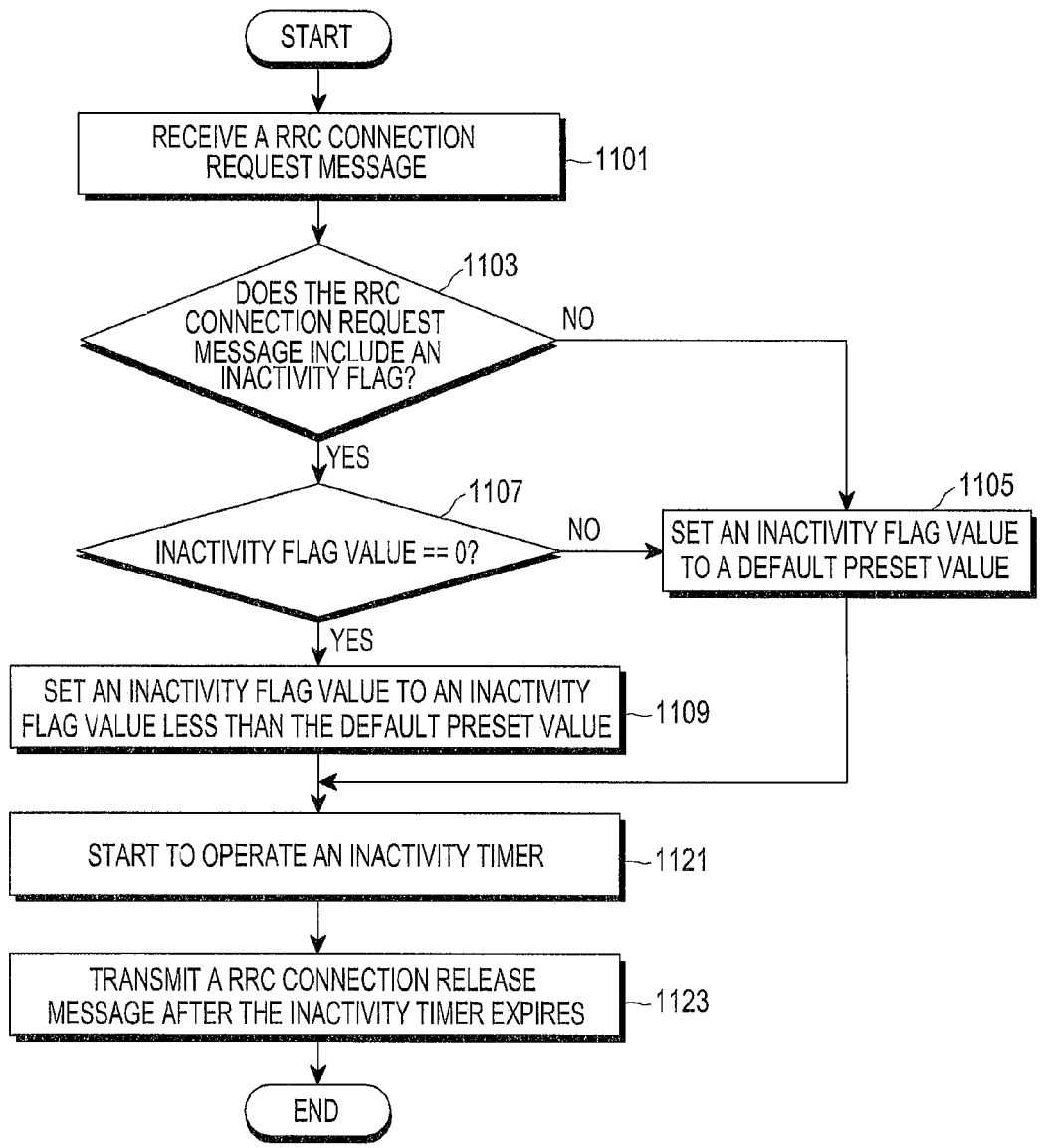
FIG. 11 is an example of a process of releasing a RRC connection in an eNB in a communication system according to this disclosure.

FIG. 11 is an example of a process of releasing a RRC connection in an eNB in a communication system according to this disclosure.

It will be noted that a process of releasing a RRC connection in an eNB can be a process of releasing a RRC connection in an eNB in an LTE communication system.

Referring to FIG. 11, an eNB can receive a RRC connection request message from a UE at operation 1101.

The eNB can determine whether the RRC connection request message received from the UE includes an inactivity flag at operation 1103. If the RRC connection request message does not include the inactivity flag, the eNB can set an inactivity timer value of an inactivity timer to a default inactivity timer value at operation 1105.

If the RRC connection request message includes the inactivity flag, the eNB can determine whether an inactivity flag value of the inactivity flag is 0 at operation 1107. If the inactivity flag value is not 0, the eNB can set the inactivity timer value of the inactivity timer to the default inactivity timer value at operation 1105.

If the inactivity flag value is 0, the eNB can set the inactivity timer value to an inactivity timer value less than the default inactivity timer value at operation 1109.

The eNB can start operating the inactivity timer based on the inactivity timer value set at operation 1105 or operation 1109 at operation 1121.

If the inactivity timer which starts being operated at operation 1121 expires, the eNB can transmit a RRC connection release message to the UE at operation 1123.

A process of releasing a RRC connection between an eNB and a UE in an LTE communication system is described in FIG. 11. However, it will be understood by those of ordinary skill in the art that the process of releasing the RRC connection between the eNB and the UE can be applied to a 3G communication system. In the 3G communication system, an operation of setting a timer can be performed like the LTE communication system. However, in the 3G communication system, the UE and not the eNB can set the timer unlike the LTE communication system.

Although FIG. 11 is an example of a process of releasing a RRC connection in an eNB in a communication system, various changes could be made to FIG. 11. For example, while shown as a series of operations, various operations in FIG. 11 can overlap, occur in parallel, occur in a different order, or occur multiple times.

A scheme of detecting a traffic type of traffic which occurs in an application, such as a scheme of classifying the traffic which occurs in the application into user traffic and non-user traffic, such as background control traffic will be described below.

The first scheme of detecting a traffic type of traffic which occurs in an application will be followed below.

In a 3G communication system, a UE can include a UE timer. If the UE timer expires, the UE can transmit a connection release indication message to an eNB to release a RRC connection which is set between the UE and the eNB. So, unlike an LTE communication system, in the 3G communication system, if the UE sets up a RRC connection with the eNB, the UE can be configured to set an inactivity timer value of an inactivity timer included in the UE to a default inactivity timer value or a default timer value without transmitting information on a user interaction occurrence which a radio module acquires from a UI module, such as an inactivity flag to an eNB. That is, the scheme of classifying the traffic into the user traffic and the background control traffic through the UI module included in the UE can efficiently classify the traffic into the user traffic and the background control traffic with a relative less load for the UE and the eNB. The scheme of classifying the traffic into the user traffic and the background control traffic may not need to modify a conventional application since the scheme does not affect the conventional application.

The second scheme of detecting a traffic type of traffic which occurs in an application will be followed below.

The second scheme can classify the traffic which occurs into user traffic and background control traffic by transferring application traffic with an inactivity flag to a radio module. That is, the traffic type can be notified to the radio module by setting an inactivity flag value of the inactivity flag to '1' if the traffic which is transferred to the radio module is the user traffic, and can set the inactivity flag value of the inactivity flag to '0' if the traffic which is transferred to the radio module is the background control traffic. In the second scheme, there can be an advantage of certainly detecting the occurred traffic as the user traffic or the background control traffic to decrease load of the UE and the eNB. However, in the second scheme, all applications can provide traffic and an inactivity flag when traffic occurs.

The third scheme of detecting a traffic type of traffic which occurs in an application will be followed below.

An eNB can be configured to classify a traffic type of traffic which the eNB receives through a deep packet inspection (DPI). That is, if a UE transmits a packet, the eNB can determine whether the received packet is user traffic or background control traffic by inspecting a payload included in the received packet through the DPI. This scheme of classifying the traffic into the user traffic and the background control traffic can have an advantage of detecting a traffic type using only eNB operation regardless of a UE operation.

An example of an effect of saving battery consumption of a UE according to this disclosure will be described with reference to FIG. 12.

Figure 12:
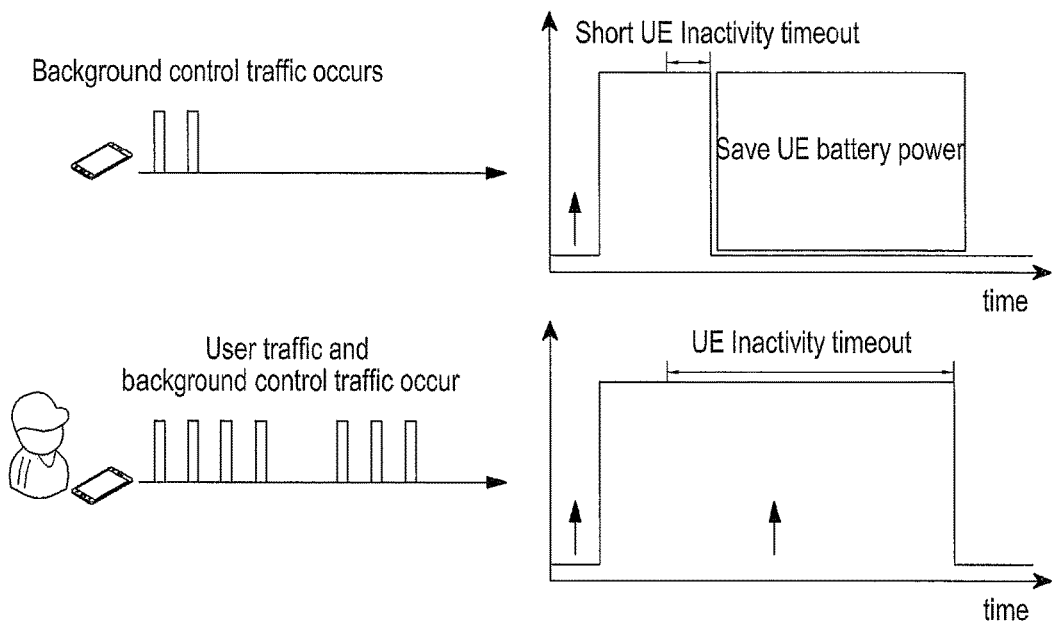
FIG. 12 is an example of an effect of saving battery consumption of a UE according to this disclosure.

FIG. 12 is an example of an effect of saving battery consumption of a UE according to this disclosure.

Referring to FIG. 12, battery consumption of a UE can be decreased and radio resource efficiency can be maximized by classifying traffic which occurs in the UE into user traffic and background control traffic and setting an appropriate inactivity timer value for each of the user traffic and the background control traffic.

An experimental result in a case that an eNB sets a spec of a UE to the following if the eNB can operate an inactivity timer and adaptively operates an inactivity timer value of the inactivity timer according to a traffic type compared with a case that the eNB operates a fixed inactivity timer value will be described below.

First, it will be assumed that the UE can use a battery V Li-ion 2,500 mAh, Connected mode: 368 mA, Idle mode: 3.85 mA per day, and uses applications such as a VoIP service: an FMC service (2 minutes), an IM service: Kakao-talk© (10 minutes), Google Talk© (15 minutes), an SNS: Facebook© (15 minutes), Twitter© (30 minutes), and a widget service: WonGi Chae© (30 minutes).

It will be assumed that a smart phone user usage pattern of the UE can be a smart phone user usage pattern proposed in "collection and analysis of smart phone usage pattern for managing mobile communication network", KNOM Conference 2011 (Postech) which is hereby incorporated by references as if fully set forth herein.

It will be assumed that a default inactivity timer value is set to 30 seconds, and two inactivity timer values less than the default inactivity timer value are set to 10 seconds and 5 seconds, respectively.

If the default inactivity timer value is set to 30 seconds, 368 mA*30 s*1,251*0.85=11,739,384 mAs of battery consumption can occur.

If the default inactivity timer value is set to 10 seconds, (368 mA*10 s+3.85 mA*20 s)*1,251*0.85=3,995,005 mAs of battery consumption occurs, so it will be understood that battery consumption in the case that 10 seconds of default inactivity timer value is set can be decreased by 2,151 mAh (66%) compared with battery consumption the case that 30 seconds of default inactivity timer value is set. That is, it will be understood that an effect of 86% compared to a total battery power of the UE.

If the default inactivity timer value is set to 5 seconds, (368 mA*5 s+3.85 mA*25 s)*1,251*0.85=2,049,607 mAs of battery consumption occurs, so it will be understood that battery consumption in the case that 10 seconds of default inactivity timer value is set can be decreased by 2,691 mAh (83%) compared with battery consumption the case that 30 seconds of default inactivity timer value is set. That is, it will be understood that an effect of 107% compared to the total battery power of the UE.

An addition of an inactivity flag according to this disclosure can be implemented without changing a standard of a related communication system, and can be promptly applied between a UE and an eNB of which manufactures are the same.

If a manufacturer of a UE is different from a manufacturer of an eNB, the UE and the eNB can use a conventional inactivity flag even though the UE and the eNB do not use the same inactivity flag, so a performance may not decrease.

An example of an effect of saving battery consumption of a UE according to this disclosure has been described with reference to FIG. 12, and an example of an inner structure of a UE in a communication system according to this disclosure will be described with reference to FIG. 13.

Figure 13:
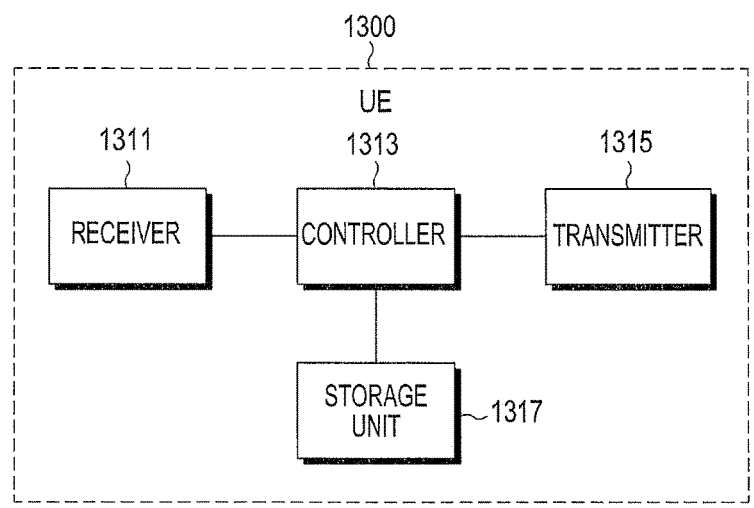
FIG. 13 is an example of an inner structure of a UE in a communication system according to this disclosure.

FIG. 13 is an example of an inner structure of a UE in a communication system according to this disclosure.

Referring to FIG. 13, a UE 1300 can include a receiver 1311, a controller 1313, a transmitter 1315, and a storage 1317.

The controller 1313 can be configured to control the overall operation of the UE 1300. More particularly, the controller 1313 can be configured to control the UE 1300 to perform an operation related to an operation of setting up/releasing a RRC connection between the UE 1300 and an eNB. The operation related to the operation of setting up/releasing the RRC connection between the UE 1300 and the eNB can be performed in the manner described with reference to FIGS. 1 to 12 and a description thereof will be omitted herein.

The receiver 1311 can be configured to receive various messages, and the like from other entities such as an eNB, a RNC, and the like under a control of the controller 1313. The various messages, and the like received in the receiver 1311 have been described in FIGS. 1 to 12 and a description thereof will be omitted herein.

The transmitter 1315 can be configured to transmit various messages, and the like to other entities such as the eNB, the RNC, and the like under a control of the controller 1313. The various messages, and the like transmitted in the transmitter 1315 have been described in FIGS. 1 to 12 and a description thereof will be omitted herein.

The storage 1317 can be configured to store the various messages, and the like received in the receiver 1311, various data necessary for an operation of the UE 1300, such as information related to the operation of setting up/releasing the RRC connection between the UE 1300 and the eNB, and the like.

While the receiver 1311, the controller 1313, the transmitter 1315, and the storage 1317 are shown in FIG. 13 as separate units, it is to be understood that this is merely for convenience of description. In other words, two or more of the receiver 1311, the controller 1313, the transmitter 1315, and the storage 1317 can be incorporated into a single unit.

An example of an inner structure of a UE in a communication system according to this disclosure has been described with reference to FIG. 13, and an example of an inner structure of an eNB in a communication system according to this disclosure will be described with reference to FIG. 14.

Figure 14:
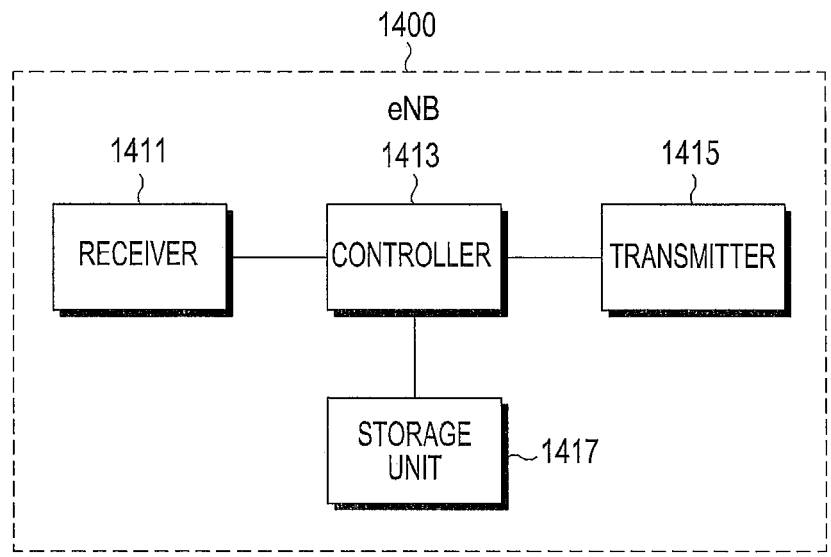
FIG. 14 is an example of an inner structure of an eNB in a communication system according to this disclosure.

FIG. 14 is an example of an inner structure of an eNB in a communication system according to this disclosure.

Referring to FIG. 14, an eNB 1400 can includes a receiver 1411, a controller 1413, a transmitter 1415, and a storage 1417.

The controller 1413 can be configured to control the overall operation of the eNB 1400. More particularly, the controller 1413 can be configured to control the eNB 1400 to perform an operation related to an operation of setting up/releasing a RRC connection between a UE and the eNB 1400. The operation related to the operation of setting up/releasing the RRC connection between the UE and the eNB 1400 can be performed in the manner described with reference to FIGS. 1 to 12 and a description thereof will be omitted herein.

The receiver 1411 can be configured to receive various messages, and the like from other entities such as a UE, a RNC, and the like under a control of the controller 1413. The various messages, and the like received in the receiver 1411 have been described in FIGS. 1 to 12 and a description thereof will be omitted herein.

The transmitter 1415 can be configured to transmit various messages, and the like to other entities such as the UE, the RNC, and the like under a control of the controller 1413. The various messages, and the like transmitted in the transmitter 1415 have been described in FIGS. 1 to 12 and a description thereof will be omitted herein.

The storage 1417 can be configured to store the various messages, and the like received in the receiver 1411, various data necessary for an operation of the eNB 1400, such as information related to the operation of setting up/releasing the RRC connection between the UE and the eNB 1400, and the like.

While the receiver 1411, the controller 1413, the transmitter 1415, and the storage 1417 are shown in FIG. 14 as separate units, it is to be understood that this is merely for convenience of description. In other words, two or more of the receiver 1411, the controller 1413, the transmitter 1415, and the storage 1417 can be incorporated into a single unit.

An example of an inner structure of an eNB in a communication system according to this disclosure has been described with reference to FIG. 14, and an example of an inner structure of a RNC in a communication system according to this disclosure will be described with reference to FIG. 15.

Figure 15:
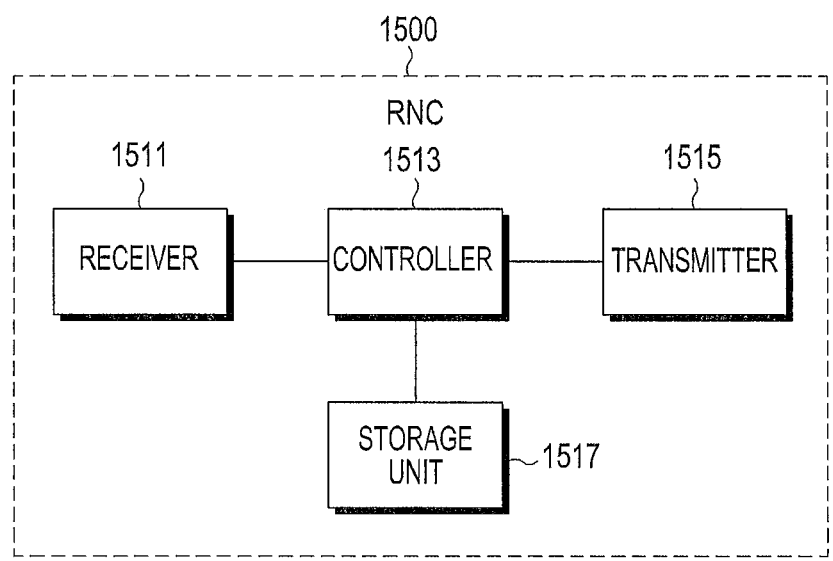
FIG. 15 is an example of an inner structure of a RNC in a communication system according to this disclosure.

FIG. 15 is an example of an inner structure of a RNC in a communication system according to this disclosure.

Referring to FIG. 15, a RNC 1500 can include a receiver 1511, a controller 1513, a transmitter 1515, and a storage 1517.

The controller 1513 can be configured to control the overall operation of the RNC 1500. More particularly, the controller 1513 can be configured to control the RNC 1500 to perform an operation related to an operation of setting up/releasing a RRC connection between a UE and an eNB. The operation related to the operation of setting up/releasing the RRC connection between the UE and the eNB can be performed in the manner described with reference to FIGS. 1 to 12 and a description thereof will be omitted herein.

The receiver 1511 can be configured to receive various messages, and the like from other entities such as an eNB, an SGSN, and the like under a control of the controller 1513. The various messages, and the like received in the receiver 1511 have been described in FIGS. 1 to 12 and a description thereof will be omitted herein.

The transmitter 1515 can be configured to transmit various messages, and the like to other entities such as the eNB, the SGSN, and the like under a control of the controller 1513. The various messages, and the like transmitted in the transmitter 1515 have been described in FIGS. 1 to 12 and a description thereof will be omitted herein.

The storage 1517 can be configured to store the various messages, and the like received in the receiver 1511, various data necessary for an operation of the RNC 1500, such as information related to the operation of setting up/releasing the RRC connection between the UE and the eNB, and the like.

While the receiver 1511, the controller 1513, the transmitter 1515, and the storage 1517 are shown in FIG. 15 as separate units, it is to be understood that this is merely for convenience of description. In other words, two or more of the receiver 1511, the controller 1513, the transmitter 1515, and the storage 1517 can be incorporated into a single unit.

An example of an inner structure of a RNC in a communication system according to this disclosure has been described with reference to FIG. 15, and an example of an inner structure of an SGSN in a communication system according to this disclosure will be described with reference to FIG. 16.

Figure 16:
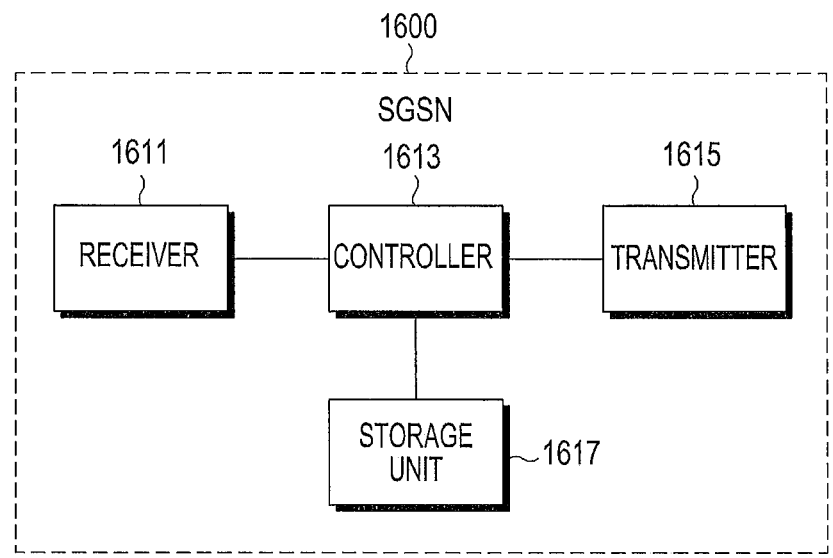
FIG. 16 is an example of an inner structure of an SGSN in a communication system according to this disclosure.

FIG. 16 is an example of an inner structure of an SGSN in a communication system according to this disclosure.

Referring to FIG. 16, an SGSN 1600 can include a receiver 1611, a controller 1613, a transmitter 1615, and a storage 1617.

The controller 1613 can be configured to control the overall operation of the SGSN 1600. More particularly, the controller 1613 can be configured to control the SGSN 1600 to perform an operation related to an operation of setting up/releasing a RRC connection between a UE and an eNB. The operation related to the operation of setting up/releasing the RRC connection between the UE and the eNB can be performed in the manner described with reference to FIGS. 1 to 12 and a description thereof will be omitted herein.

The receiver 1611 can be configured to receive various messages, and the like from other entities such as a RNC, a GGSN, and the like under a control of the controller 1613. The various messages, and the like received in the receiver 1611 have been described in FIGS. 1 to 12 and a description thereof will be omitted herein.

The transmitter 1615 can be configured to transmit various messages, and the like to other entities such as the RNC, the GGSN and the like under a control of the controller 1613. The various messages, and the like transmitted in the transmitter 1615 have been described in FIGS. 1 to 12 and a description thereof will be omitted herein.

The storage 1617 can be configured to store the various messages, and the like received in the receiver 1611, various data necessary for an operation of the SGSN 1600, such as information related to the operation of setting up/releasing the RRC connection between the UE and the eNB, and the like.

While the receiver 1611, the controller 1613, the transmitter 1615, and the storage 1617 are shown in FIG. 16 as separate units, it is to be understood that this is merely for convenience of description. In other words, two or more of the receiver 1611, the controller 1613, the transmitter 1615, and the storage 1617 can be incorporated into a single unit.

An example of an inner structure of an SGSN in a communication system according to this disclosure has been described with reference to FIG. 16, and an example of an inner structure of a GGSN in a communication system according to this disclosure will be described with reference to FIG. 17.

Figure 17:
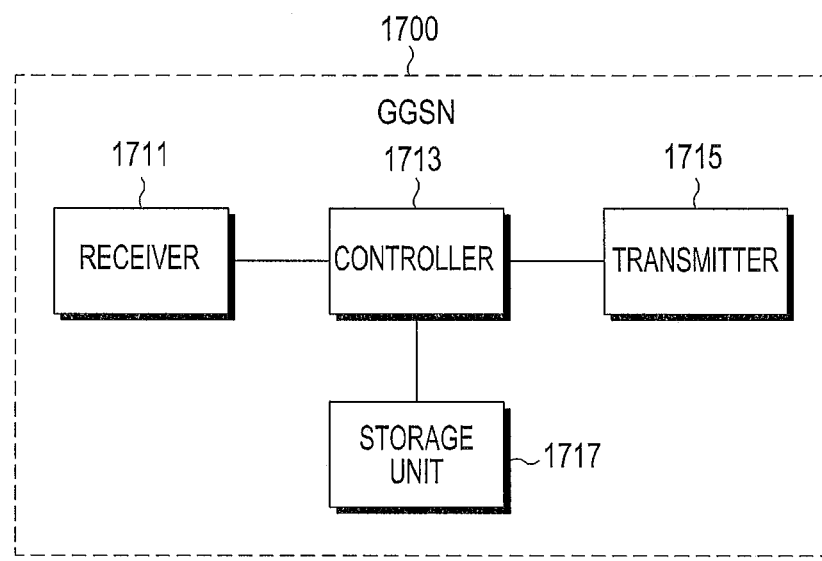
FIG. 17 is an example of an inner structure of a GGSN in a communication system according to this disclosure.

FIG. 17 is an example of an inner structure of a GGSN in a communication system according to this disclosure.

Referring to FIG. 17, a GGSN 1700 can include a receiver 1711, a controller 1713, a transmitter 1715, and a storage 1717.

The controller 1713 can be configured to control the overall operation of the GGSN 1700. More particularly, the controller 1713 can be configured to control the GGSN 1700 to perform an operation related to an operation of setting up/releasing a RRC connection between a UE and an eNB. The operation related to the operation of setting up/releasing the RRC connection between the UE and the eNB can be performed in the manner described with reference to FIGS. 1 to 12 and a description thereof will be omitted herein.

The receiver 1711 can be configured to receive various messages, and the like from other entities such as an SGSN, and the like under a control of the controller 1713. The various messages, and the like received in the receiver 1711 have been described in FIGS. 1 to 12 and a description thereof will be omitted herein.

The transmitter 1715 can be configured to transmit various messages, and the like to other entities such as the SGSN, and the like under a control of the controller 1713. The various messages, and the like transmitted in the transmitter 1715 have been described in FIGS. 1 to 12 and a description thereof will be omitted herein.

The storage 1717 can be configured to store the various messages, and the like received in the receiver 1711, various data necessary for an operation of the GGSN 1700, such as information related to the operation of setting up/releasing the RRC connection between the UE and the eNB, and the like.

While the receiver 1711, the controller 1713, the transmitter 1715, and the storage 1717 are shown in FIG. 17 as separate units, it is to be understood that this is merely for convenience of description. In other words, two or more of the receiver 1711, the controller 1713, the transmitter 1715, and the storage 1717 can be incorporated into a single unit.

As is apparent from the foregoing description, an embodiment of the present disclosure enables to set up/release a RRC connection between a UE and an eNB based on a traffic type in a communication system.

An embodiment of the present disclosure enables to set up/release a RRC connection between a UE and an eNB in a communication system thereby decreasing battery consumption of a UE.

An embodiment of the present disclosure enables to set up/release a RRC connection between a UE and an eNB by adaptively operating an inactivity timer for transiting to an idle state based on a traffic type in a communication system.

An embodiment of the present disclosure enables to set up/release a RRC connection between a UE and an eNB by adaptively operating an inactivity timer for transiting to an idle state based on a traffic type in a communication system thereby increasing an efficiency of a radio resource.

Certain aspects of the present disclosure can also be embodied as computer readable code on a computer readable recording medium. A computer readable recording medium is any data storage device that can store data, which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

It can be appreciated that a method and apparatus according to an embodiment of the present disclosure can be implemented by hardware, software and/or a combination thereof. The software can be stored in a non-volatile storage, for example, an erasable or re-writable Read Only Memory (ROM), a memory, for example, a Random Access Memory (RAM, a memory chip, a memory device, or a memory Integrated Circuit (IC), or an optically or magnetically recordable non-transitory machine-readable, such as computer-readable, storage medium, such as a Compact Disk (CD), a Digital Versatile Disk (DVD), a magnetic disk, or a magnetic tape. A method and apparatus according to an embodiment of the present disclosure can be implemented by a computer or a mobile terminal that includes a controller and a memory, and the memory can be an example of a non-transitory machine-readable, such as computer-readable, storage medium suitable to store a program or programs including instructions for implementing various embodiments of the present disclosure.

The present disclosure can include a program including code for implementing the apparatus and method as defined by the appended claims, and a non-transitory machine-readable, such as computer-readable, storage medium storing the program. The program can be electronically transferred via any media, such as communication signals, which are transmitted through wired and/or wireless connections, and the present disclosure can include their equivalents.

An apparatus according to an embodiment of the present disclosure can receive the program from a program providing device which is connected to the apparatus via a wire or a wireless and store the program. The program providing device can include a memory for storing instructions which instruct to perform a contents protect method which has been already installed, information necessary for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of a user equipment (UE) in a communication system, the method comprising:
   identifying a type of traffic for an application to be used in the UE;
   in response to the identified type being data traffic triggered based on a user input, setting a value of an inactivity timer as a first value;
   in response to the identified type being control traffic that occurs periodically regardless of the user input, setting the value of the inactivity timer as a second value less than the first value;
   starting the inactivity timer; and
   when the inactivity timer is expired, transmitting, to a radio network controller (RNC), a radio resource control (RRC) connection release indication message that requests to release an RRC connection between a base station (BS) and the UE.

2. The method of claim 1, further comprising:
   receiving, from the RNC, an RRC connection release message in response to the RRC connection release indication message; and
   releasing the RRC connection, and transmitting, to the RNC, an RRC connection release complete message.

3. A method of a user equipment (UE) in a communication system, the method comprising:
   identifying a type of traffic for an application to be used in the UE;
   transmitting to a base station (BS), a radio resource control (RRC) connection request message to request an RRC connection between the BS and the UE,
   wherein the RRC connection request message comprises information indicating the identified type of the traffic; and
   receiving, from the BS, an RRC connection release message to release the RRC connection when an inactivity timer corresponding to the traffic is expired,
   wherein in response to the information indicating the identified type being data traffic triggered based on a user input, a value of the inactivity timer is set as a first value, and in response to the information indicating the identified type being control traffic that occurs periodically regardless of the user input, the value of the inactivity timer is set as a second value less than the first value.

4. The method of claim 3, further comprising:
   when the RRC connection release message is received, transitioning from an RRC connected mode to an RRC idle mode.

5. A method of a base station (BS) in a communication system, the method comprising:
   receiving, from a user equipment (UE)
   a radio resource control (RRC) connection request message to request an RRC connection between the BS and the UE,
   wherein the RRC connection request message comprises information indicating a type of traffic for an application to be used in the UE;
   in response to the information indicating the type being data traffic triggered based on a user input, setting a value of an inactivity timer of the UE as a first value, and in response to the information indicating the type being control traffic that occurs periodically regardless of the user input, setting the value of the inactivity timer as a second value less than the first value; and
   transmitting, to the UE, an RRC connection release message to release the RRC connection when the inactivity timer is expired.

6. The method of claim 5, wherein the RRC connection release message indicates that the UE transitions from an RRC connected mode to an RRC idle mode.

7. A user equipment (UE) in a communication system, the UE comprising:
   a controller configured to:
      identify a type of traffic for an application to be used in the UE, in response to the identified type being data traffic triggered based on a user input,
      set a value of an inactivity timer as a first value,
      in response to the identified type being control traffic that occurs periodically regardless of the user input, set the value of the inactivity timer as a second value less than the first value, and
      start the inactivity timer; and
   a transceiver configured to, when the inactivity timer is expired, transmit, to a radio network controller (RNC), a radio resource control (RRC) connection release indication message that requests to release an RRC connection between a base station (BS) and the UE.

8. The UE of claim 7, wherein the transceiver is configured to receive, from the RNC, an RRC connection release message in response to the RRC connection release indication message, and the controller is configured to release the RRC connection, and transmitting, to the RNC, an RRC connection release complete message.

9. A user equipment (UE) in a communication system, the UE comprising:
   a controller configured to identify a type of traffic; and
   a transceiver configured to transmit, to a base station (BS), a radio resource control (RRC) connection request message to request an RRC connection between the BS and the UE, wherein the RRC connection request message comprises information indicating the identified type of the traffic, and receive, from the BS, an RRC connection release message to release the RRC connection when an inactivity timer corresponding to the traffic is expired,
   wherein in response to the information indicating the identified type being data traffic triggered based on a user input, a value of the inactivity timer is set as a first value, and in response to the information indicating the identified type being control traffic that occurs periodically regardless of the user input, the value of the inactivity timer is set as a second value less than the first value.

10. The UE of claim 9, wherein the
   RRC connection release message is received, the controller is configured to transit from an RRC connected mode to an RRC idle mode.

11. A base station (BS) in a communication system, the BS comprising:
   a transceiver configured to receive, from a user equipment (UE),
   a radio resource control (RRC) connection request message to request an RRC connection between the BS and the UE,
   wherein the RRC connection request message comprises information indicating a type of traffic for an application to be used in the UE; and
   a controller configured to set a value of an inactivity timer of the UE as a first value in response to the information indicating the type being data traffic triggered based on a user input, set the value of the inactivity timer as a second value less than the first value in response to the information indicating the type being control traffic that occurs periodically regardless of the user input, and control the transceiver to transmit, to the UE, an RRC connection release message to release the RRC connection when the inactivity timer is expired.

12. The BS of claim 11, wherein the RRC connection release message indicates that the UE transitions from an RRC connected mode to an RRC idle mode.

* * * * *